United States Patent
Fetterman et al.

(10) Patent No.: US 9,817,668 B2
(45) Date of Patent: Nov. 14, 2017

(54) BATCHED REPLAYS OF DIVERGENT OPERATIONS

(75) Inventors: Michael Fetterman, Boxborough, MA (US); Jack Hilaire Choquette, Palo Alto, CA (US); Omkar Paranjape, Austin, TX (US); Anjana Rajendran, San Jose, CA (US); Eric Lyell Hill, Palo Alto, CA (US); Stewart Glenn Carlton, Madison, AL (US); Rajeshwaran Selvanesan, Milpitas, CA (US); Douglas J. Hahn, Los Altos, CA (US); Steven James Heinrich, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 901 days.

(21) Appl. No.: 13/329,066

(22) Filed: Dec. 16, 2011

(65) Prior Publication Data

US 2013/0159684 A1    Jun. 20, 2013

(51) Int. Cl.
*G06F 9/38* (2006.01)

(52) U.S. Cl.
CPC .......... *G06F 9/3851* (2013.01); *G06F 9/3861* (2013.01)

(58) Field of Classification Search
CPC .............................. G06F 9/3838; G06F 9/3851
USPC .......................................... 712/22, 215, 219
See application file for complete search history.

(56) References Cited

U.S. PATENT DOCUMENTS

| 8,266,383 | B1* | 9/2012 | Minkin et al. ................. 711/125 |
| 2002/0087801 | A1 | 7/2002 | Bogin et al. |
| 2002/0091914 | A1* | 7/2002 | Merchant et al. ............ 712/219 |
| 2004/0172523 | A1 | 9/2004 | Merchant et al. |
| 2008/0143730 | A1* | 6/2008 | Lindholm et al. ............ 345/501 |
| 2010/0262781 | A1* | 10/2010 | Hrusecky et al. ............ 711/119 |
| 2011/0078358 | A1* | 3/2011 | Shebanow ........................ 711/3 |

FOREIGN PATENT DOCUMENTS

TW    201007572 A    2/2010

OTHER PUBLICATIONS

Batten et al., "Cache Refill/Access Decoupling for Vector Machines", MIT Computer Science and Artificial Intellegence Laboratory, The Stata Center, IEEE Computer Society, Proceedings of the 37th International Symposium on Microarchitecture.
Sylvain Collange, "Multi-threading or SIMD? How GPU Architectures exploit regularity", ARCH'11, Jun. 14, 2011.

* cited by examiner

*Primary Examiner* — Keith Vicary
(74) *Attorney, Agent, or Firm* — Artegis Law Group, LLP

(57) ABSTRACT

One embodiment of the present invention sets forth an approach for executing replay operations for divergent operations in a parallel processing subsystem. Specifically, the streaming multiprocessor (SM) includes a multistage pipeline configured to batch two or more replay operations for processing via replay loop. A logic element within the multistage pipeline detects whether the current pipeline stage is accessing a shared resource, such as loading data from a shared memory. If the threads are accessing data which are distributed across multiple cache lines, then the multistage pipeline batches two or more replay operations, where the replay operations are inserted into the pipeline back-to-back.

18 Claims, 7 Drawing Sheets

BATCHED REPLAYS OF DIVERGENT OPERATIONS

BACKGROUND OF THE INVENTION

Field of the Invention

The present invention generally relates to computer architectures and, more specifically, to batched replays of divergent operations.

Description of the Related Art

A common practice in parallel processing systems is to design a processor that executes some number of threads simultaneously. Each thread may execute in a separate execution pipeline within the processor. When such threads all need to execute the same instruction sequence (typically with different data for each thread), there are tangible benefits to sharing the control structures of the threads. For example, only one instruction has to be fetched, and all threads then execute that same instruction. This type of operation may be found on single instruction multi-thread (SIMT) processors and single instruction multi-data (SIMD) processors.

As execution proceeds in parallel, different threads may access a common resource, such as a shared memory, in a manner that may cause the threads to encounter a resource conflict. For example, the threads may execute a memory access operation, such as a load instruction, where the set of memory locations spans over two or more cache lines. Such a load instruction may be called a "divergent" operation because the memory locations required by the various threads are on divergent cache lines. In such situations, the pipeline transfers one of the cache lines that some of the threads are accessing, and those threads are able to complete the memory access operation. However, the other threads pointing to locations within a different cache line are not able to complete the memory access operation and remain unserviced. Thus, with a single pass through the pipeline, some threads are able to complete the memory access operation while other threads are not. Absent a means to process multiple execution cycles, the operation is not able to complete successfully.

One approach to implementing multiple execution cycles is to reinsert the instruction into a prior stage of the processing pipeline and execute the load instruction again for the threads that were not about to access data from their target memory address locations. Such a technique is called a "replay" operation. In essence, where a stage in the pipeline performs an operation that cannot be completed in the current cycle, the pipeline "replays" the load instruction once for each cache line that contains at least one target address until each thread performed the relevant memory access operation. During this process, a portion of the pipeline is utilized to complete the replay operations. Therefore, the pipeline is stalled to prevent new instructions from entering the pipeline until all replay operations have been completed. One drawback of this approach is that the pipeline is stalled until all replay operations complete. Upstream instructions may not advance in the pipeline until the pipeline stall is released, which reduces overall system performance. An additional drawback is that the parallel processing system may not be able to stall all pipeline stages within one pipeline stage delay. If the parallel processing system cannot stall the pipeline in time, one or more new instructions entering the pipeline may be improperly discarded or the replay operation is likewise discarded. In either case, the new instruction or the replay operation does not properly complete.

Another approach to implementing multiple execution cycles is to reinsert the instruction farther back in the pipeline. With this approach, the instructions being "replayed" are interleaved in the pipeline along with new instructions, which reduces the frequency of pipeline stalls, thereby increasing pipeline performance. One drawback of this approach, however, is increased latency of the instructions being replayed. For example, consider a processor with 32 simultaneously executing threads. In a divergent load operation, the target address locations for the 32 threads may diverge across 32 different cache lines. If a replay is inserted one pipeline stage back, then the pipeline may stall for 31 pipeline cycles while the 31 replay operations execute. Inserting the replay six pipeline stages back increases the latency for the instructions being replayed to six pipeline stages multiplied by 31 replay operations or 186 pipeline cycles.

As the foregoing illustrates, what is needed in the art is a more efficient way to execute replay operations for divergent operations.

SUMMARY OF THE INVENTION

One embodiment of the present invention sets forth a computer-implemented method for replaying a memory access operation. A load store unit selects a first thread and a second thread from a group of threads configured to execute an instruction in a multi-stage pipeline, where neither the first thread nor the second thread has yet executed the instruction. The load-store unit then selects a first set of threads to associate with the first thread. The load-store unit selects a second set of threads to associate with the second thread. The load-store unit inserts a first replay operation associated with the first thread and the first set of threads into the multi-stage pipeline to execute the instruction. The load store then inserts replay operation associated with the second thread and the second set of threads into the multi-stage pipeline to execute the instruction, where the second thread and the second set of threads are inserted into the multi-stage pipeline serially relative to the first thread and the first set of threads.

One advantage of the disclosed technique is that the latency to complete a divergent operation is reduced where the threads need to access data across more than one cache line in memory. Further, the pipeline is used more efficiently when two or more replay operations are inserted back-to-back as a batched group as opposed to waiting for a replay to clear the pipeline before inserting a subsequent replay operation back into the pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
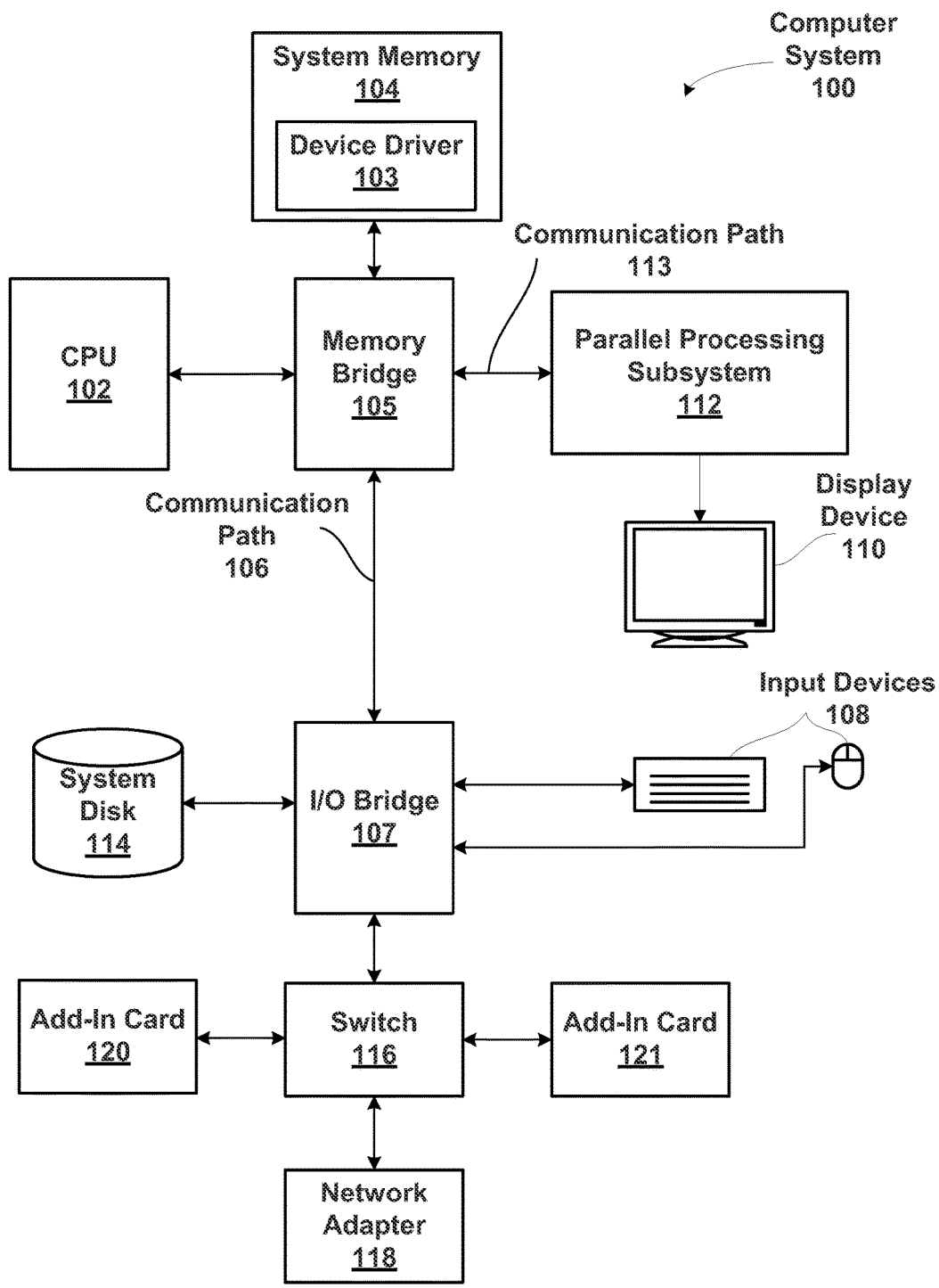
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
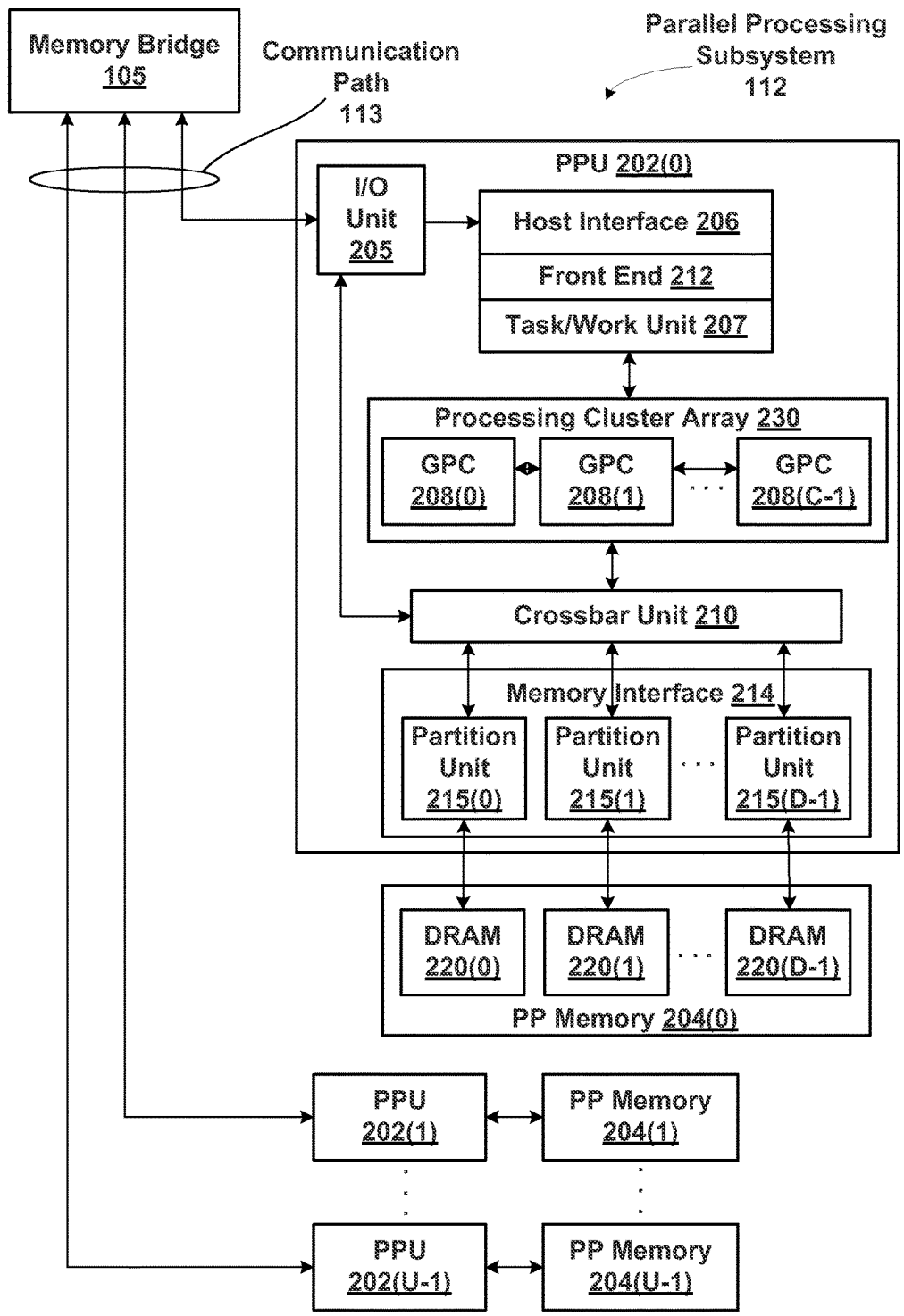
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing system 112 may output data to display device 110 or each PPU 202 in parallel processing system 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
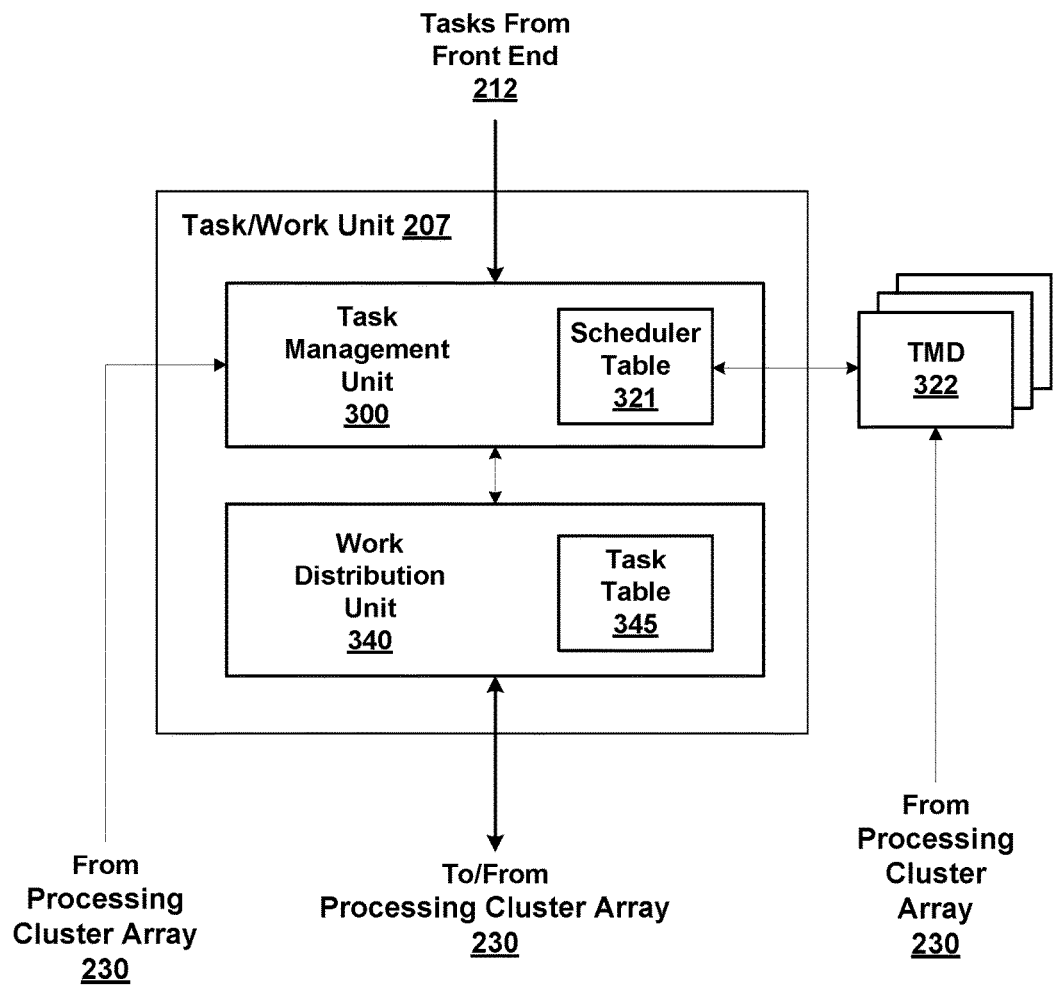
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to a list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
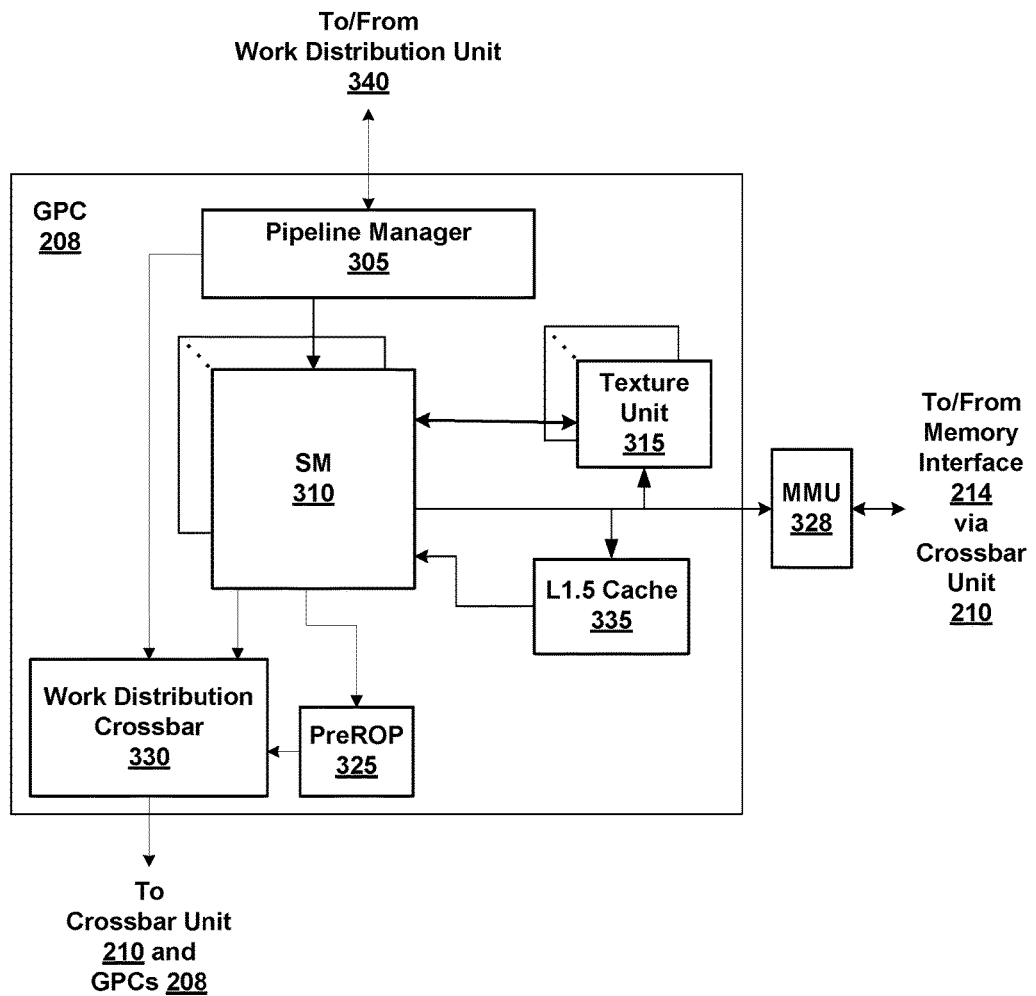
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may be associated with a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
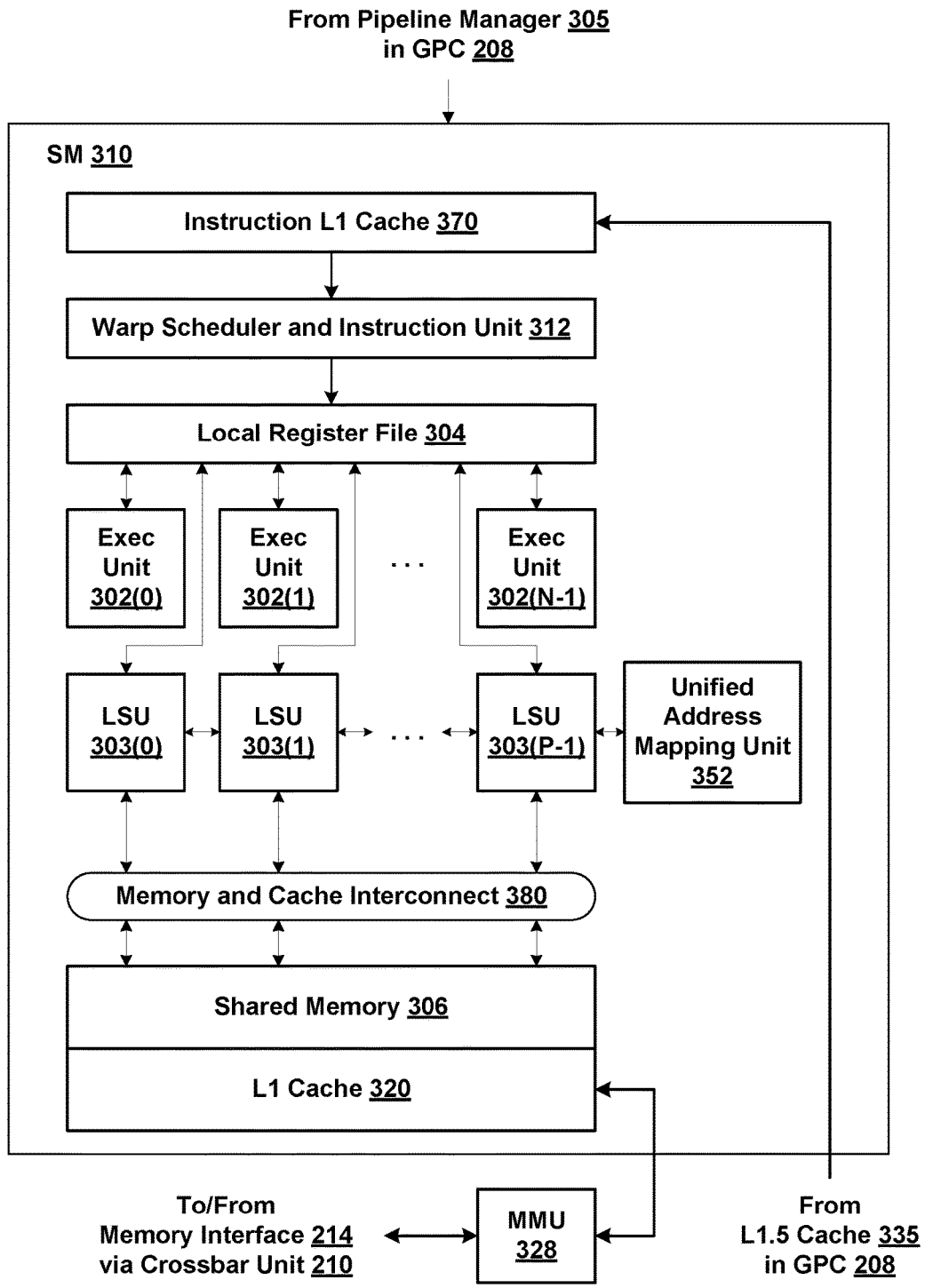
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache (not explicitly shown) stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Batched Replay of Divergent Operations

Figure 4:
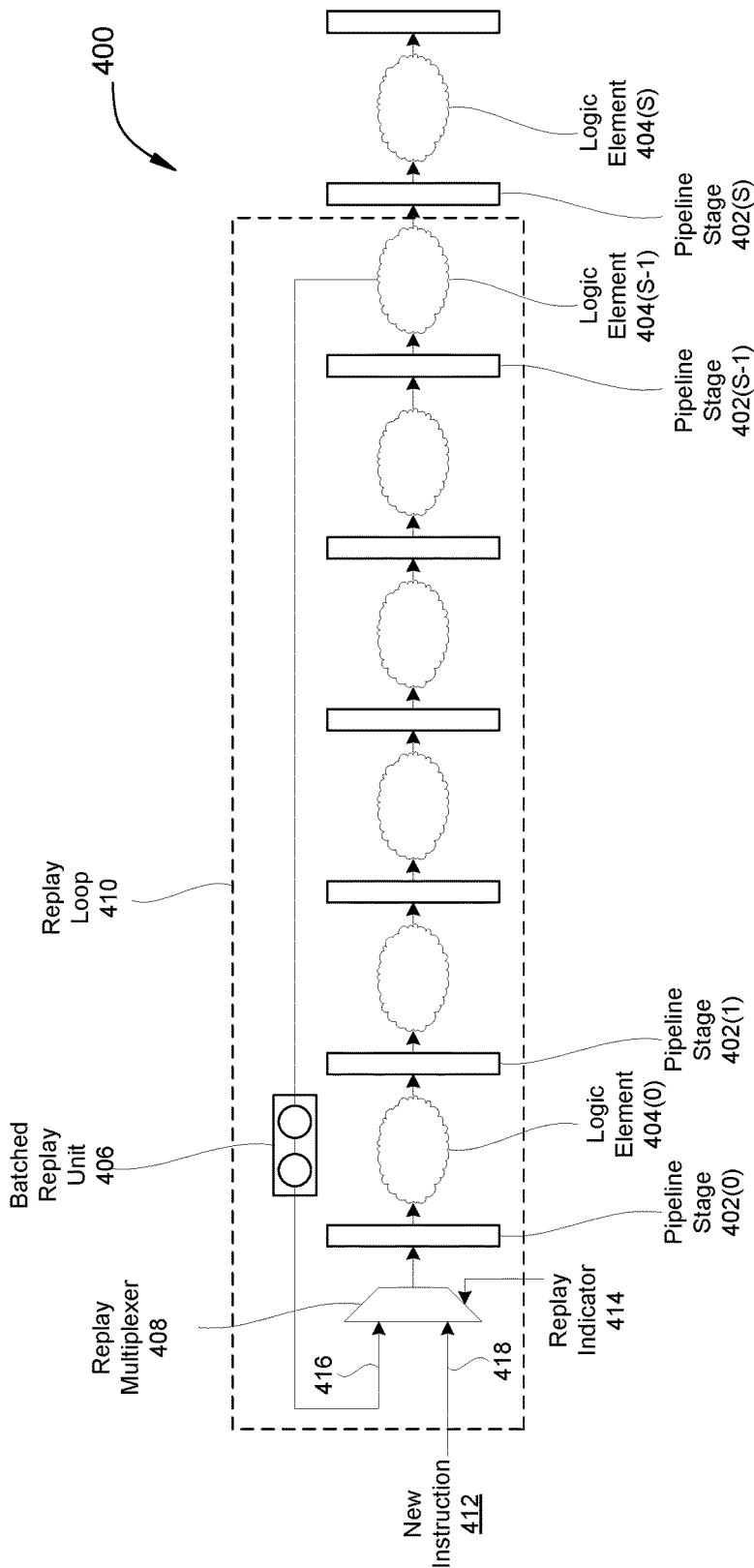
FIG. 4 illustrates a multistage pipeline configured to implement batched replays of divergent operations, according to one embodiment of the present invention.

FIG. 4 illustrates a multistage pipeline 400 configured to implement batched replays of divergent operations, according to one embodiment of the present invention. As shown, the multistage pipeline 400 includes pipeline stages 402, logic elements 404, a batched replay unit 406, and a replay multiplexer 408. In various implementations, the multistage pipeline 400 may reside within an Exec Unit 302 or an LSU 303 of the streaming multiprocessor (SM) 310, as shown in FIG. 3C.

Pipeline stages 402 store intermediate results for various instructions as they progress through multistage pipeline 400. The pipeline stages 402 store the intermediate results at the beginning of each clock cycle of the multistage pipeline 400. Multiple instructions may be present in the multistage pipeline 400 at various stages of progress. For example, an instruction enters the multistage pipeline and is stored into pipeline stage 402(0) at the beginning of a specific clock cycle. At the beginning of the next clock cycle, this instruction progresses to pipeline stage 402(1) while another instruction enters the multistage pipeline and is stored into pipeline stage 402(0). Each instruction typically progresses one pipeline stage 402 for every clock cycle of the multistage pipeline 400.

Logic elements 404 separate the pipeline stages 402. Logic elements 404 may perform any function required by the SM 310 including, without limitation, arithmetic operations, logical operations, and load/store operations. For example, an instruction stored into pipeline stage 402(0) is presented as an input to logic element 404(0). After a period of delay, the logic element 404(0) is presented as a functional result to the input of pipeline stage 402(1). This result is then stored in pipeline stage 402(1) at the next clock cycle of the multistage pipeline 400. In this fashion, the instruction performs the various functions determined by the logic elements 404 as the instruction progresses along the pipeline stages 402. The instruction proceeds through the multistage pipeline 400 with each clock cycle until the instruction has passed through all pipeline stages 402. In general, the total latency through the multistage pipeline 400 is equal to the number of pipeline stages 402 within the multistage pipeline 400 multiplied by the time period between successive pipeline clock cycles. The delay through the logic elements 404 is typically low in order to minimize the clock cycle time to the pipeline stages 402, thereby maximizing pipeline performance. Once the instruction reaches pipeline stage 402 (S−1), the LSU 303 determines that the instruction is a memory access operation. The LSU 303 transfers a cache line referenced by at least one thread and services all threads that are accessing the same cache line. If the instruction is a divergent operation, then, by definition, some threads remain unserviced, as previously described herein. In such a situation, the LSU 303 selects one more provoking threads for a replay operation, where a provoking thread is any one of the unserviced threads. Each provoking thread in turn represents a provoking thread family, where the provoking thread family includes the set of threads that need to access the same cache line as the provoking thread associated with that provoking thread family. In some cases, the provoking thread family may have no other members than the corresponding provoking thread. Replay operations associated with the selected provoking threads are batched for replay and passed to the batched replay unit 406 via the replay loop 410.

The batched replay unit 406 receives batched replay operations via replay loop 410 and inserts the different replay operations back into the multithreaded pipeline 400. Again, replay operations are implemented for memory access operations involving multiple cache lines that need to be accessed by different threads as the result of a divergent operation. The batched replay unit 406 inserts up to B replay operations in succession into the multistage pipeline 400 via input 416 of replay multiplexer 408, where B is the maximum number of replay operations that can be processed in a given batch. The replay operations in a particular batch proceed serially through the multistage pipeline 400. Once a replay operation within the batch reaches logic element 404(S−1), the LSU 303 determines whether any unserviced threads remain. If so, then the LSU 303 prepares another batch of up to B replay operations in the manner discussed above.

The replay multiplexer 408 selects whether one or more new instructions 412 or one or more replay operations are allowed to enter the multistage pipeline 400 at pipeline stage 402(0). The replay multiplexer 408 is controlled by the replay indicator 414. Initially, the replay indicator 414 is set to select input 418 of the replay multiplexer 408, so when an incoming new instruction 412 appears at input 418 of the replay multiplexer 408, the new instruction 412 passes through input 418 of the replay multiplexer 408 and is presented at the input of the first pipeline stage 402(0). As described above, if the LSU 303 detects a divergent operation, then one or more replay operations may be required in order to complete the instruction across all threads. In such cases, the LSU 303 asserts the replay indicator 414 to select input 416 of the replay multiplexer 408. In response, one or more replay operations from the batched replay unit 406 are passed through the replay loop 410 and permitted to pass through the replay multiplexer 408 for processing in the multistage pipeline 400. Once the replay operations have entered the multistage pipeline 400, the LSU 303 may remove the replay indicator 414, allowing new instructions 412 to again enter the multistage pipeline 400 via input 418 of the replay multiplexer 408. Once the replay operations have been processed through the multistage pipeline 400, the LSU 303 determines whether all threads have been serviced. If some threads remain unserviced, then the LSU 303 asserts the replay indicator 414, passes another batch of replay operations through the replay loop 410, and then removes the replay indicator 414. The process continues until all threads are serviced, that is, all threads have executed the instruction containing the memory access operation.

The following example illustrates how batched replay operations are processed in an exemplary multistage pipeline 400, where B=2. A new instruction 412 may enter the multistage pipeline 400 via input 418 of replay multiplexer 408. The instruction may then be stored in pipeline stage 402(0) at the next clock cycle. The instruction may then be processed through logic element 404(0) producing an intermediate result. The intermediate result may be stored at the next clock cycle in pipeline stage 402(1). The instruction may progress through the multistage pipeline 400 until the instruction reaches pipeline stage 402(S−1) and then presented to logic element 404(S−1). LSU 303 may detect that the instruction is programmed to initiate a memory access operation, such as a data load from shared memory, during this stage of the multistage pipeline 400. Once the memory access operation has been executed, and if the instruction is a divergent operation, then some threads may remain unserviced.

In such a situation, the LSU 303 may select up to two provoking threads from among the threads still needing service. The two replay operations may be transmitted via the replay loop 410 to the batched replay unit 406. The LSU 303 may assert the replay indicator 414 so that replay operations may be routed from the batched replay unit 406 through the replay multiplexer 408 and stored in pipeline stage 402(0). The first of the two replay operations may be inserted into the multistage pipeline 400 at pipeline stage 402(0). One clock cycle later, the first replay may be stored in pipeline stage 402(1), while the second replay may be inserted into the multistage pipeline 400 at pipeline stage 402(0), the LSU 303 may remove the replay indicator 414 and release the multistage pipeline 400 to allow a new instruction 412 to enter the multistage pipeline 400. The two replay operations may progress through the multistage pipeline 400 one pipeline stage 402 apart until the first replay reaches logic element 404(S−1). At this point, the LSU 303 may again determine whether additional threads need servicing and, if so, may prepare another batched replay. The process continues until all threads have been serviced.

Thus, where the maximum replay batch size B=2, and the length of replay loop 410 is six pipeline stages, a memory access operation requiring no replay operations may pass from pipeline stage 402(0) to 402(S) in a single pass or six clock cycles. Where a single replay is required, the memory access operation may pass from pipeline stage 402(0) to 402(S) in two passes or twelve clock cycles. If two replay operations are required, then the second replay may be inserted into replay loop 410 one cycle after the first replay, yielding a total latency of thirteen clock cycles. A memory access operation requiring three or four replay operations may yield a latency of eighteen or nineteen clock cycles respectively, and so on.

It will be appreciated that the architecture described herein is illustrative only and that variations and modifications are possible. For example, the techniques described herein apply to multistage pipelines 400 with replay loops 410 of any length and are not restricted to replay loops 410 comprising six pipeline stages 402. In another example, the architecture described herein is presented in the context of a multi-stage pipeline within the load-store unit 303 of a streaming multiprocessor 310. The architecture may be employed, without limitation, in association with a central processing unit (CPU), general processing unit (GPU), or in any other technically feasible compute environment.

In another example, greater efficiencies may be achieved where the maximum replay batch B is greater than 2. As a practical matter, the replay loop 410 may be fully utilized where B=S. A person having ordinary skill in the art will understand the optimum value for B is determined by the length S of replay loop 410, the nature of instructions progressing through the multistage pipeline 400, and other factors. In yet another example, replay operations within a batched replay are typically inserted into the multistage pipeline 400 at successive clock cycles such that adjacent replay operations within a batch progress through the multistage pipeline 400 one pipeline stage 402 apart from each other. However, successive insertions may occur at other intervals greater than one clock cycle. In yet another example, the techniques described herein are presented in context of the LSU 303, but may apply to any multistage pipeline 400 that accesses shared resources. In addition, the techniques described herein assume the pipeline is released upon completion of all replay operations associated with the memory access operation. However, the multistage pipeline 400 may be designed to interleave new instructions 412 with replay operations, further improving performance.

The techniques described herein are described with respect to memory access operations across multiple threads where the threads access memory locations across divergent cache lines. The techniques are sufficiently flexible to be employed in other applications where divergent operations are present. In one example, the techniques described herein are not limited to execution of threads, but may be employed any operations which may proceed via multiple passes through one or more stages of a multi-stage pipeline. In another example, the threads or other operations may diverge across resources other than cache lines, thus benefiting from batched replay operations. Such resources may include, without limitation, cache tags, cache data, and shared memory. In yet another example, the techniques described herein employ replay operations when threads diverge across more than one cache line. In some applications, a multi-stage pipeline may retrieve more than one cache line during any given pass. Batched replay operations may still be employed where threads access resources that may not be retrieved in a single pass where multiple cache lines are retrieved.

A person having ordinary skill in the art will understand the manner in which provoking threads may be determined and selected for processing. In one example, the total number of provoking threads and corresponding provoking thread families may be determined in the same clock cycle. One or more threads may be tagged for processing in the current pass through the multistage pipeline 400 while the remaining threads remain unserviced until a later pass. In another example, a single provoking thread may be selected during a given clock cycle. While this provoking thread begins processing, a next provoking thread, if any, may be selected during a following clock cycle. Thus, provoking threads may be determined one at a time as needed until all threads are serviced. In addition to these two approaches, any technically feasible method of selecting provoking threads and determining provoking thread families may be employed. Any reasonable criteria may be used to select a specific thread for processing where multiple provoking threads have been selected. Thus, a provoking thread may be randomly selected from among the threads that require servicing. Alternatively, a provoking thread may be selected based on which thread produces the largest provoking thread family, or again in any other reasonable manner.

Figure 5:
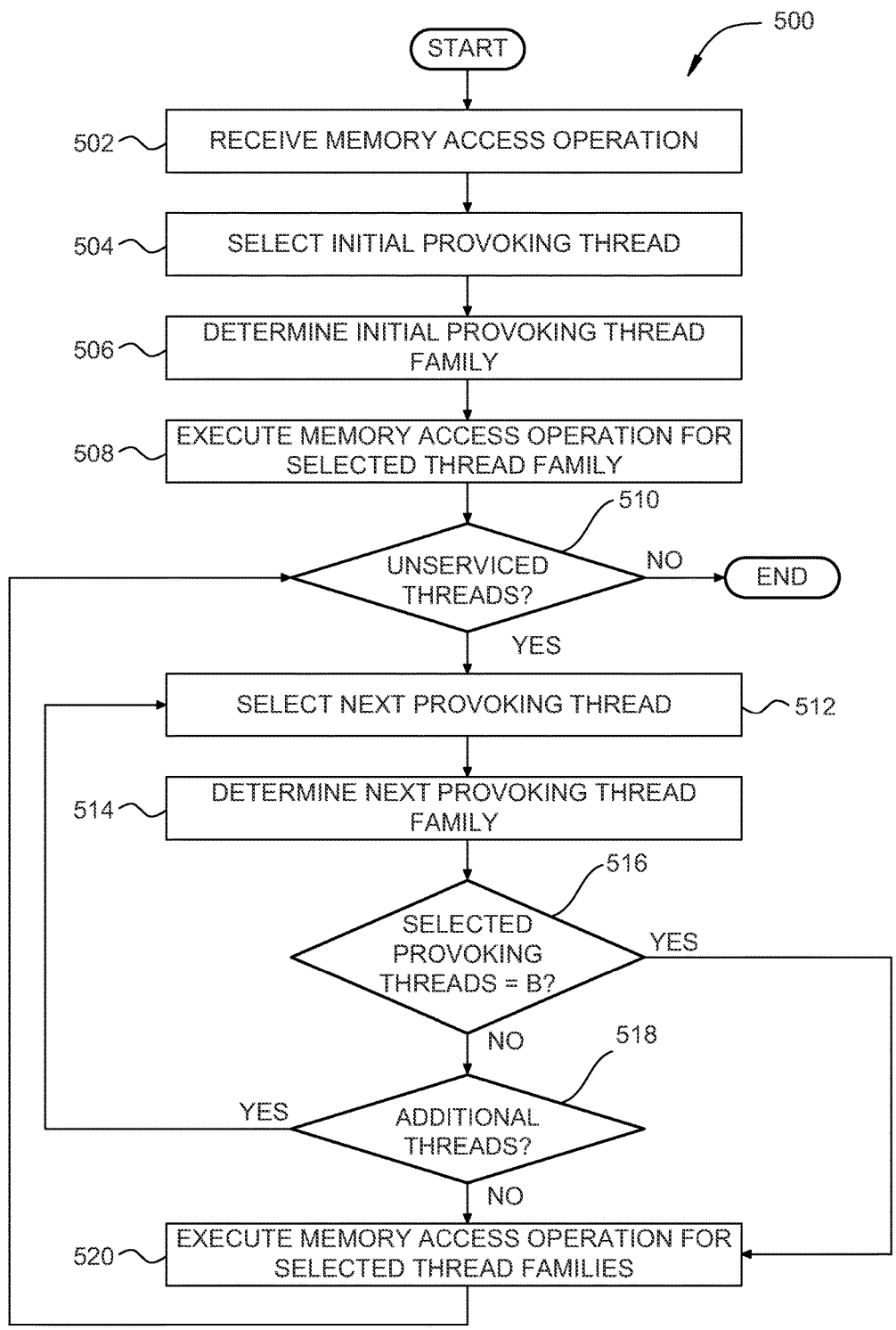
FIG. 5 is a flow diagram of method steps for executing batched replay operations in a multistage pipeline, according to one embodiment of the present invention.

FIG. 5 is a flow diagram of method steps for executing batched replay operations in a multistage pipeline 400, according to one embodiment of the present invention. Although the method steps are described in conjunction with the systems of FIGS. 1-4, persons of ordinary skill in the art will understand that any system configured to perform the method steps, in any order, is within the scope of the present invention.

The method 500 begins at step 502, where the LSU 303 receives a memory access operation such as an instruction to load a data value from a shared memory at a specified address. Each thread may be programmed to load data from addresses on the same or different cache lines. At step 504, the LSU 303 selects a provoking thread from among the various threads that require servicing to complete the memory access operation. The provoking thread may be selected based on a number of criteria or policies including, without limitation, selecting a thread on a cache line that has the highest number of target addresses for the particular memory access operation. At step 506, the LSU 303 determines the provoking thread family. The provoking thread family includes the set of threads that need to access the same cache line as the provoking thread associated with that provoking thread family. In some cases, the provoking thread family may have no other members than the corresponding provoking thread. At step 508, the LSU 303 executes the memory access operation for the provoking thread family by transferring the cache line addressed by the provoking thread, and completing the memory access operation for all threads within the provoking thread family.

At step 510, the LSU 303 determines whether there are any remaining threads which are unserviced. An unserviced thread is one that has not yet completed the memory access operation. If no threads are unserviced, then the method 500 terminates. If unserviced threads remain, then the method 500 proceeds to step 512, where the LSU 303 selects a next provoking thread from the set of unserviced threads. At step 514, the LSU 303 determines the provoking thread family represented by the next provoking thread. At step 516, the LSU 303 determines whether the number of selected provoking threads is equal to B, where B is the maximum number of replay operations that may be batched in the replay loop 410. If B threads have been selected, then the method 500 proceeds to step 520, where the LSU 303 executes the memory access operation for the set of B provoking threads (and their families) by inserting them into the replay multiplexer 408, in succession. If less than B threads have been selected, then the method 500 proceeds to step 518, where the LSU 303 determines whether there are additional threads which have neither been serviced nor selected for servicing. If additional threads remain, then the method 500 returns to step 512, where another provoking thread is selected. If no additional threads remain, then the method 500 proceeds to step 520, where the LSU 303 executes the memory access operation for the final set of provoking threads (and their families) by inserting them into the replay multiplexer 408, in succession. After executing the memory access operation at step 520, the method 500 returns to step 510, where the process continues until all threads have been serviced, at which point the method 500 terminates.

In sum, the disclosed technique provides an optimized way to execute replay operations for divergent operations in a parallel processing subsystem. Specifically, the streaming multiprocessor (SM) 310 includes a multistage pipeline 400 configured to batch two or more replay operations for processing via replay loop 410. A logic element 404 within the multistage pipeline 400 detects whether the current pipeline stage 402 is accessing a shared resource, such as loading data from a shared memory. If the threads are accessing data which are distributed across two cache lines, then a first family of threads is serviced during the first pass through the multistage pipeline 400. A single replay operation is required to service the remaining threads. If the threads are accessing data which are distributed across more than two cache lines, then a first family of threads is serviced during the first pass through the multistage pipeline 400. In this case, two or more replay operations are required to service the remaining threads. The multistage pipeline 400 batches two or more replay operations through the replay loop 410, where the replay operations are inserted into the pipeline back-to-back. If additional threads need servicing after the first batched replay, then the process continues until all threads are serviced.

Advantageously, divergent operations requiring two or more replay operations operate with reduced latency. Where memory access operations require transfer of more than two cache lines to service all threads, the number of clock cycles required to complete all replay operations is reduced. The multistage pipeline 400 is utilized more efficiently because two or more replay operations progress through the replay loop 410 simultaneously. Additionally, new instructions 412 waiting to enter the multistage pipeline 400 at the replay insertion point experience reduced delay caused by the replay operation.

While the foregoing is directed to embodiments of the present invention, other and further embodiments of the invention may be devised without departing from the basic scope thereof, and the scope thereof is determined by the claims that follow.

What is claimed is:

1. A computer-implemented method for replaying a shared resource access operation, the method comprising:
    selecting a first thread and a second thread from a group of threads configured to simultaneously execute an instruction in a multi-stage pipeline, wherein neither the first thread nor the second thread has yet executed the instruction after one or more execution operations of the instruction for the group of threads, the first thread accesses a first shared resource, the second thread accesses a second shared resource, and the first shared resource and the second shared resource are not retrievable during the same execution operation;
    selecting a first set of threads to associate with the first thread;
    selecting a second set of threads to associate with the second thread;
    inserting a first replay operation associated with the first thread and the first set of threads into the multi-stage pipeline to execute the instruction; and
    inserting a second replay operation associated with the second thread and the second set of threads into the multi-stage pipeline to execute the instruction, wherein the second replay operation is inserted into the multi-stage pipeline serially relative to the first replay operation.

2. The method of claim 1, wherein the first thread and the first set of threads share no common thread with the second thread and the second set of threads.

3. The method of claim 1, wherein the first set of threads is selected concurrently with the selection of the first thread, and the second set of threads is selected concurrently with the selection of the second thread.

4. The method of claim 1, wherein the second replay operation associated with the second thread and the second set of threads is inserted into the multi-stage pipeline one pipeline stage subsequent to the first replay operation associated with the first thread and the first set of threads.

5. The method of claim 1, wherein the first thread and each thread in the first set of threads are configured to access the first shared resource, and the second thread and each thread in the second set of threads are configured to access the second shared resource.

6. The method of claim 5, wherein the first replay operation associated with the first thread and the first set of threads and the second replay operation associated with the second thread and the second set of threads are inserted into the multi-stage pipeline via a first pipeline stage of the multi-stage pipeline that is subsequent to a second pipeline stage of the multi-stage pipeline.

7. The method of claim 5, wherein a second instruction is inserted into the multi-stage pipeline serially relative to the second replay operation associated with the second thread and the second set of threads.

8. A subsystem for replaying a shared resource access operation, comprising:
    a load-store unit (LSU) configured to:
        select a first thread and a second thread from a group of threads configured to simultaneously execute an instruction in a multi-stage pipeline, wherein neither the first thread nor the second thread has yet executed the instruction after one or more execution operations of the instruction for the group of threads, the first thread accesses a first shared resource, the second thread accesses a second shared resource, and the first shared resource and the second shared resource are not retrievable during the same execution operation;
        select a first set of threads to associate with the first thread;
        select a second set of threads to associate with the second thread;
        insert a first replay operation associated with the first thread and the first set of threads into the multi-stage pipeline to execute the instruction; and insert a second replay operation associated with the second thread and the second set of threads into the multi-stage pipeline to execute the instruction, wherein the second replay operation is inserted into the multi-stage pipeline serially relative to the first replay operation.

9. The subsystem of claim 8, wherein the first thread and the first set of threads share no common thread with the second thread and the second set of threads.

10. The subsystem of claim 8, wherein the first set of threads is selected concurrently with the selection of the first thread, and the second set of threads is selected concurrently with the selection of the second thread.

11. The subsystem of claim 8, wherein the second replay operation associated with the second thread and the second set of threads is inserted into the multi-stage pipeline one pipeline stage subsequent to the first replay operation associated with the first thread and the first set of threads.

12. The subsystem of claim 8, wherein the first thread and each thread in the first set of threads are configured to access the first shared resource, and the second thread and each thread in the second set of threads are configured to access the second shared resource.

13. The subsystem of claim 12, wherein the first replay operation associated with the first thread and the first set of threads and the second replay operation associated with the second thread and the second set of threads are inserted into the multi-stage pipeline via a first pipeline stage of the multi-stage pipeline that is subsequent to a second pipeline stage of the multi-stage pipeline.

14. The subsystem of claim 12, wherein a second instruction is inserted into the multi-stage pipeline serially relative to the second replay operation associated with the second thread and the second set of threads.

15. A computing device, comprising:
a subsystem that includes a load-store unit (LSU) configured to:
select a first thread and a second thread from a group of threads configured to simultaneously execute an instruction in a multi-stage pipeline, wherein neither the first thread nor the second thread has yet executed the instruction after one or more execution operations of the instruction for the group of threads, the first thread accesses a first shared resource, the second thread accesses a second shared resource, and the first shared resource and the second shared resource are not retrievable during the same execution operation;
select a first set of threads to associate with the first thread;
select a second set of threads to associate with the second thread;
insert a first replay operation associated with the first thread and the first set of threads into the multi-stage pipeline to execute the instruction; and
insert a second replay operation associated with the second thread and the second set of threads into the multi-stage pipeline to execute the instruction, wherein the second replay operation is inserted into the multi-stage pipeline serially relative to the replay operation.

16. The computing device of claim 15, wherein the first thread and each thread in the first set of threads are configured to access the first shared resource, and the second thread and each thread in the second set of threads are configured to access the second shared resource.

17. The computing device of claim 16, wherein the first replay operation associated with the first thread and the first set of threads and the second replay operation associated with the second thread and the second set of threads are inserted into the multi-stage pipeline via a first pipeline stage of the multi-stage pipeline that is subsequent to a second pipeline stage of the multi-stage pipeline.

18. The computing device of claim 16, wherein a second instruction is inserted into the multi-stage pipeline serially relative to the second replay operation associated with the second thread and the second set of threads.

* * * * *